(12) United States Patent
Laban et al.

(10) Patent No.: US 12,223,270 B2
(45) Date of Patent: Feb. 11, 2025

(54) SYSTEMS AND METHODS NEAR NEGATIVE DISTINCTION FOR EVALUATING NLP MODELS

(71) Applicant: Salesforce, Inc., San Francisco, CA (US)

(72) Inventors: Philippe Laban, New York, NY (US); Chien-Sheng Wu, Mountain View, CA (US); Wenhao Liu, Redwood City, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 293 days.

(21) Appl. No.: 17/837,546

(22) Filed: Jun. 10, 2022

(65) Prior Publication Data

US 2023/0229861 A1 Jul. 20, 2023

Related U.S. Application Data

(60) Provisional application No. 63/299,791, filed on Jan. 14, 2022.

(51) Int. Cl.
*G06F 40/284* (2020.01)

(52) U.S. Cl.
CPC .................. *G06F 40/284* (2020.01)

(58) Field of Classification Search
None
See application file for complete search history.

(56) References Cited

U.S. PATENT DOCUMENTS

| 9,437,189 | B2 * | 9/2016 | Epstein | G10L 15/063 |
| 10,747,962 | B1 * | 8/2020 | Fuerstenau | G06N 3/08 |
| 11,972,211 | B1 * | 4/2024 | Singh | G06N 3/04 |
| 2020/0126533 | A1 * | 4/2020 | Doyle | G10L 15/063 |
| 2023/0122609 | A1 * | 4/2023 | Mukherjee | G06F 40/58 |
| | | | | 715/254 |

* cited by examiner

*Primary Examiner* — Stella L. Woo
(74) *Attorney, Agent, or Firm* — Haynes and Boone, LLP

(57) ABSTRACT

Embodiments described herein provide a method of evaluating a natural language processing model. The method includes receiving an evaluation dataset that may include a plurality of unit tests, the unit tests having: an input context, and a first candidate and a second candidate that are generated in response to the input context, where the first test candidate is associated with a first quality notation, and the second candidate is associated with a second quality notation. The method includes determining, via a model, a first likelihood of generating the first candidate and a second likelihood of generating the second candidate in response to the input context. The method also includes determining whether the first likelihood being greater than the second likelihood. The method also includes determining whether the first model passed the unit test, where the first quality notation indicates a higher quality candidate and the second quality notation indicate a lower quality candidate.

20 Claims, 19 Drawing Sheets

400

```
┌─────────────────────────────────────────────────────────────────────────┐
│ Determine via a generating model, a likelihood of generating a plurality│
│ of candidates including the first candidate and the second candidate in │
│ response to the input context                                           │
│                                    402                                  │
└─────────────────────────────────────────────────────────────────────────┘
                                     ↓
┌─────────────────────────────────────────────────────────────────────────┐
│         Receive the first quality notation associated with the first    │
│                                 candidate                               │
│                                    404                                  │
└─────────────────────────────────────────────────────────────────────────┘
                                     ↓
┌─────────────────────────────────────────────────────────────────────────┐
│       Receive the second quality notation associated with the second    │
│                                 candidate                               │
│                                    406                                  │
└─────────────────────────────────────────────────────────────────────────┘
                                     ↓
┌─────────────────────────────────────────────────────────────────────────┐
│ Determine whether the first candidate and the second candidate provide a│
│ near negative distinction, the near negative distinction indicating a   │
│ difference in quality of output of the generating model in response to  │
│ the input context                                                       │
│                                    408                                  │
└─────────────────────────────────────────────────────────────────────────┘
                                     ↓
┌─────────────────────────────────────────────────────────────────────────┐
│ Generate the unit text that associates the input context with first     │
│ candidate having the first quality notation and the second candidate    │
│ having the second quality notation.                                     │
│                                    410                                  │
└─────────────────────────────────────────────────────────────────────────┘
```

FIG. 4

| Metric | QGen Rank τ | QGen Gap τ | Gen. QA Rank τ | Gen. QA Gap τ | Summ. Rank τ | Summ. Gap τ |
|---|---|---|---|---|---|---|
| BLEU | 0.65 | 0.35 | 0.40 | 0.63 | 0.45 | 0.74 |
| R-1 | 0.64 | 0.31 | 0.40 | 0.57 | 0.55 | 0.84 |
| R-2 | 0.65 | 0.34 | 0.27 | 0.56 | 0.55 | 0.86 |
| R-L | 0.65 | 0.41 | 0.40 | 0.57 | 0.55 | 0.85 |
| METEOR | 0.65 | 0.36 | 0.27 | 0.56 | 0.55 | 0.72 |
| BERT | 0.49 | 0.36 | 0.40 | 0.57 | 0.65 | 0.67 |
| BARTScore | 0.65 | 0.40 | 0.27 | 0.57 | 0.75 | 0.74 |
| QuestEval | 0.65 | 0.39 | 0.27 | 0.56 | 0.75 | 0.79 |
| NND | 0.78 | 0.80 | 0.67 | 0.86 | 0.70 | 0.86 |

FIG. 6

| #NND Tests | | Quiz Design NND | | | |
|---|---|---|---|---|---|
| | | Overall | Disfluent | Off Tgt | W. Chat |
| | | 2686 | 711 | 890 | 1085 |
| Model | %A | NND Test Pass Rate (%) | | | |
| Distil-GPT2 | 33.4 | 44.9 | 52.7 | 37.0 | 46.0 |
| GPT2-base | 40.9 | 52.3 | 60.3 | 49.7 | 49.3 |
| GPT2-med | 51.3 | 60.8 | 63.3 | 64.5 | 56.1 |
| BART-Base | 52.0 | 59.6 | 60.5 | 64.5 | 55.0 |
| ProphetNet | 53.5 | 67.7 | 58.1 | 79.8 | 64.1 |
| BART-Large | 58.4 | 64.2 | 69.3 | 70.8 | 59.4 |
| MixQG-L | 68.4 | 70.9 | 66.9 | 80.9 | 65.3 |
| MixQG-3B | - | 72.9 | 69.5 | 81.7 | 67.8 |
| Macaw-3B | - | 69.2 | 70.3 | 73.3 | 65.1 |
| Macaw-11B | - | 70.6 | 69.3 | 78.0 | 65.4 |

FIG. 7

SYSTEMS AND METHODS NEAR NEGATIVE DISTINCTION FOR EVALUATING NLP MODELS

CROSS REFERENCE(S)

The instant application is a nonprovisional of and claims priority under 35 U.S.C. 119 to U.S. provisional application No. 63/299,791, filed Jan. 14, 2022, which is hereby expressly incorporated by reference herein in its entirety.

TECHNICAL FIELD

The embodiments relate generally to machine learning systems, and more specifically to evaluation of Natural Language Processing models for Natural Language Generation.

BACKGROUND

Performance evaluation of different NLP models for natural language generation (NLG) tasks such as summarization and translation are challenging. Traditionally, a human expert is often employed to manually detect domain-specific issues such as factual inconsistency in summarization. Such evaluation process can be expensive and difficult to reproduce. Additionally, it is difficult to selected a model for an NLG task or the size of the model suitable for an NLG task when there are multiple models available with different parameter sizes.

Therefore, there is a need for a mechanism to evaluate NLP models.

BRIEF DESCRIPTION OF THE DRAWINGS

FIG. 4 is a simplified logic flow diagram illustrating an example dataset generation method, according to embodiments described herein.

FIGS. 6-19 provide various data tables and plots illustrating example performance of the knowledge base question answering system and/or method described in FIGS. 1-5, according to one embodiment described herein.

Figure 1:
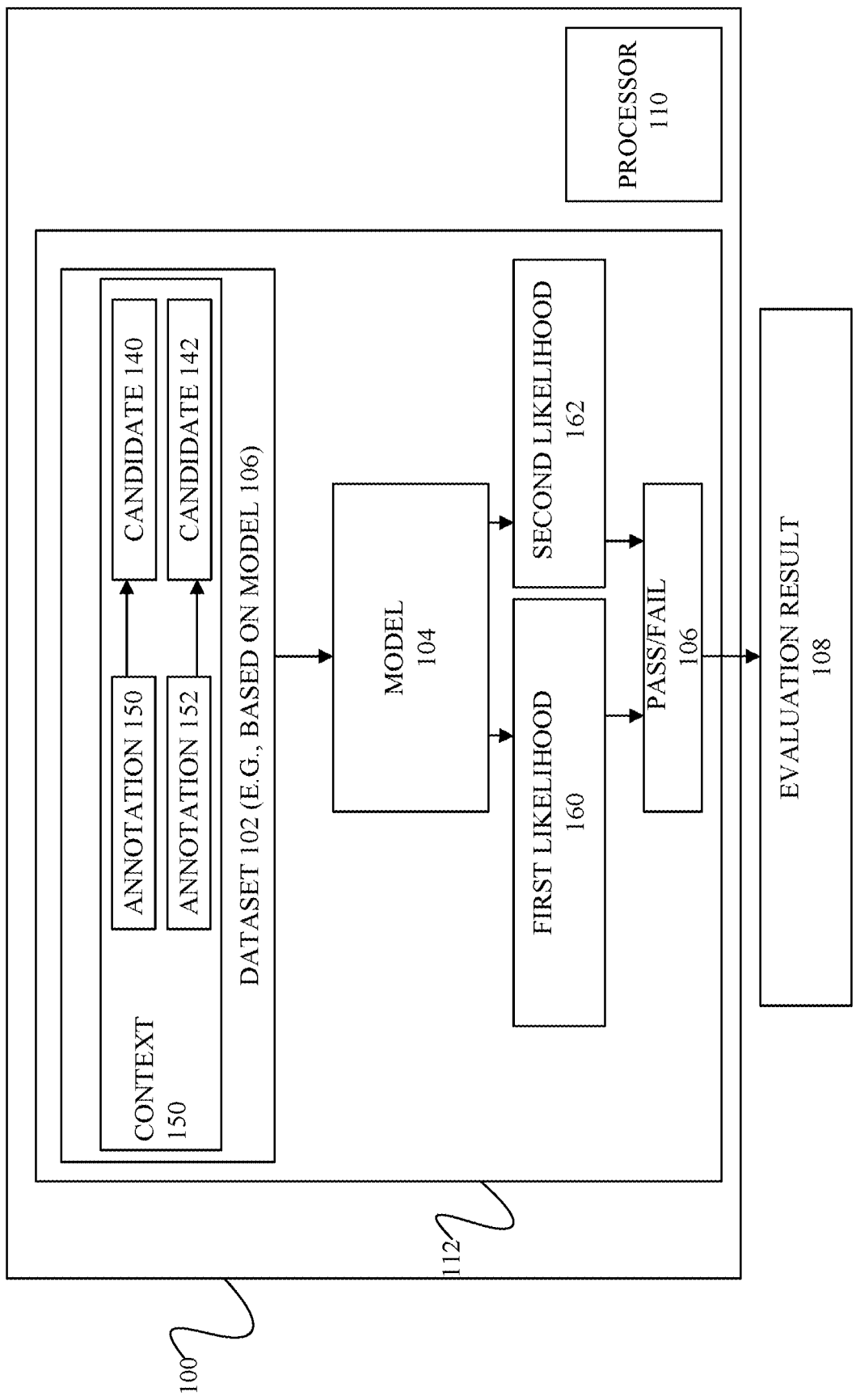
FIG. 1 is a simplified diagram illustrating an example system for evaluating a model, according to one embodiment described herein.

In the figures, elements having the same designations have the same or similar functions.

DETAILED DESCRIPTION

As used herein, the term "network" may comprise any hardware or software-based framework which includes any artificial intelligence network or system, neural network, or system and/or any training or learning models implemented thereon or therewith.

As used herein, the term "module" may comprise hardware or software-based framework that performs one or more functions. In some embodiments, the module may be implemented on one or more neural networks.

Embodiments herein describe an evaluation mechanism in a generative manner for Natural Language Generation-Near Negative Distinction (NLG-NND). At a high level, embodiments describe a method of generating an evaluation dataset from a first model (or models) and a method of using the evaluation dataset to evaluate other NLP models. For example, a first NLP model may generate, in response to an input context (e.g., tokens from a textual document), output candidates. The generated output candidates may be evaluated, via human intervention, to determine a high-quality candidate and a low-quality candidate that are associated with the same input context. The input context, the high-quality candidate and the low-quality candidate may then form a testing triplet to evaluate the performance of a second NLP model. Specifically, the second NLP model generates probabilities among a set of output candidates, in response to the same input context. The respective probabilities corresponding to the high-quality candidate and the low-quality candidate are then compared to evaluate whether the second NLP model performs better than the first model based on the human evaluation of the candidates for a specific input context. An aggregate of the respective probabilities allows a statistical evaluation of whether the second model performs better than the first model based on the alignment of the default output of the second NLP model with prior human evaluation of the candidates. In this way, human-evaluated testing data based on the first NLP model can be used to evaluate a plurality of different NLP models automatically, which largely reduces evaluation cost.

In an example, the NLP model that is appropriate for a specific task such as summarization, translation, or answering questions may be determined using a Near Negative Distinction method. For example, the near negative distinction method uses tests to determine whether a model passes or fails. Determining the appropriate model for the specific task allows selection of models that can run efficiently on devices that have fewer resources. Resource limitations may be a smaller count of CPUs, GPUs or both, devices with a smaller core count of CPUs, GPUs, or both, devices provisioned with a lower memory storage for storing and running the NLP models. For example, when a generative model is to be implemented at a user mobile device that is equipped with less hardware resources (compared with a server), determining the appropriate model including the size of the model and/or the type of model for a specific task may improve computational efficiency of the device.

FIG. 1 is a simplified diagram illustrating an example of a system for evaluation of a model for natural language generation, according to one embodiment described herein. The system 100 may include a memory 112 and a processor 110. The memory 112 may run a model 104 that is being evaluated. Examples of the model 104 may include natural language generation models such as GPT, BERT, and the like. The memory 112 may further store a dataset 120 that is used for evaluating the model 104. The system 100 may evaluate the model 104 based a comparison of the output of the model to the output of other models such as a model 106 used to generate the dataset 120.

In one embodiment, the system 100, may receive a dataset 120 (i.e., D) which includes a context 148 and a candidate 140 and a candidate 142 generated in response to the context 148. In an embodiment, the dataset 120 may include (context, $C_{high}$, $C_{low}$) triplets that may be called a unit test. The candidate 140 and the candidate 142 may be generated by NLP models such as a model 106 (described in further detail with reference to FIG. 2.) The candidate 140 may be associated with a quality notation 150 and the candidate 142 may be associated with a quality notation 152. In an example, the notation 150 may be associated with a higher quality output and the notation 152 may be associated with a lower quality candidate. In an example, the dataset 120 may include a plurality of unit tests.

The system 100 may evaluate the model 104 based on the unit test. The system 100 may determine whether the model 104 passed the unit test based on the probability (i.e., first likelihood 160) of the model 104 producing the high-quality candidate 140 and the probability (i.e., second likelihood 162) of the model 104 producing the lower quality candidate 142. The system 100 may determine the model 104 passed/failed 116 the unit test when the probability of producing the higher quality candidate 140 is greater than the probability of producing the lower quality candidate 142.

The system 100 may use sequence likelihoods to assess whether models that are being evaluated are likely to reproduce the mistakes of previous models, or if they can correctly assign lower likelihood to low-quality candidates. In an example, the system 100 may generate a sequence of tokens, $w_1, \ldots w_N$ based on the input context 148. The system 100 may determine the likelihood (e.g., the first likelihood 160 and the second likelihood 162) based on the formula:

$$LL(C) = \frac{\sum_{i=1}^{N} \log(P(w_i \mid ct, w_1, \ldots, w_{i-1}))}{N},$$

where $P(w_i| \ldots )$ is the probability assigned by the model 106 to the i-th token of the candidate, and ct is the input context 148. In an example, the system 100 may use a log likelihood to improve numerical stability. In an example, the system, 100 may normalize the likelihood by the sequence length (N) to counterbalance the effect of sequence length on likelihood.

The system 100 may perform the unit test by computing the likelihood of the candidates $LL(C_{high})$ and $LL(C_{low})$ and comparing the likelihood of the candidates. The system 100 may determine a count of the pass/fail 116 to determine an aggregate count of the number of tests the model 104 passed in response to the plurality of unit tests in the dataset 120. The system 100 may determine, the model 104 passed the test when $LL(C_{high}) > LL(C_{low})$. In cases where the model 104 fails the test, the system 100 may record the error category of $C_{low}$, to compute pass rates for the category of errors.

Thus, the system 100 may generate an evaluation result 108 by administering the plurality of unit tests in the dataset 120. In an embodiment, the system 100 may determine the evaluation result 108 which includes an overall pass rate which is the percentage of unit tests passed by the model, and the breakdown of pass-rates associated with a quality notation such as an error category. The system 100 may use the overall pass percentage to evaluate the results of the models. The system 100 may use the pass rates associated with the quality notation to evaluate performance and discover model limitations with respect to specific tasks or errors or both.

In an embodiment, the dataset 120 may be annotated with one or more labels or notations from a discrete error categorization. In an embodiment, the dataset 120 may include multiple candidates that are annotated for context 148 to allow pairs of candidates to be formed into unit near negative distinction unit tests. The dataset 120 may include labels that map to quality notations. The quality notations may refer to varying quality levels. In an embodiment, the quality notations may correspond to varying quality levels. For example, candidate 1 may be labeled with the "No Error" category is of higher quality than candidate labeled with the "Not Fluent" category. The dataset 120 may assign a quality to the error categories, and candidates of a common context may be organized into a partially ordered set, for which some preference pairs are known.

In some embodiments, the system 100 may evaluate the model 104 based on the dataset 120 for different NLG tasks. For example, the dataset 120 may include different input contexts, and the candidates that are specific to different NLG tasks such as question generation, question answering, and summarization. Although described with reference to NLG tasks such as question generation, question answering and summarization, a person of skill in the art will understand that the methods described herein may generally be applied to other NLG tasks. For example, a set of Unit tests may be generated for any NLG task. In some embodiments, the data set 120 may be generated and used to test NLG tasks such as translations with annotations, text simplification with annotations, machine translations with annotations, grammatical error correction with annotations, data-to-text generation with annotations, paraphrasing with annotations, summarization with annotations and the like.

Figure 2:
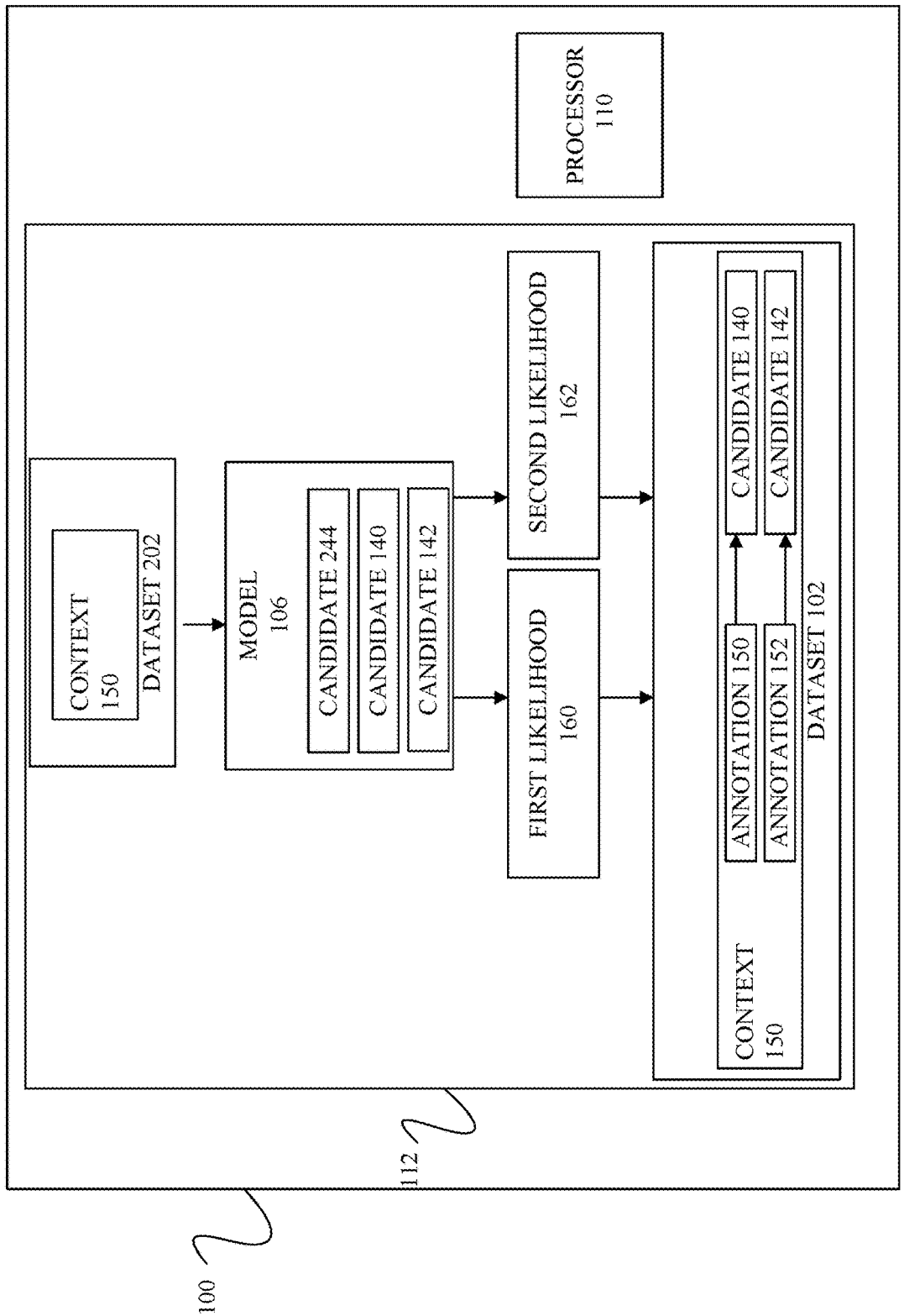
FIG. 2 is a simplified diagram illustrating an example system for generating a dataset for evaluating a model, according to one embodiment described herein.

FIG. 2 is a simplified diagram illustrating an example system for generating a dataset, according to one embodiment described herein. The system 100 may receive a dataset 202 which includes a plurality of contexts such as the context 148. The system 100 may generate a sequence of tokens based on the context 148. The system 100 may determine a plurality of candidates such as a candidate 244, the candidate 140, the candidate 142 and the like that may be generated by the model 106 (e.g., a generating model) in response to the context 148. The model 106 may be an NLG model such as BERT, GPT and the like. The system 100 may use the sequence of tokens to determine an intermediate probability associated with the plurality of candidates. For example, the model 106 may generate a plurality of candidates and output a specific candidate with the highest probability, i.e., the candidate 140 in response to the context 148. During the generation of an output during the intermediate state the model 106 may temporarily generate other candidates such as the candidate 142 and the candidate 244. These candidates may have an intermediate probability that may be below the candidate that is selected as an output. The system 100 may also determine an intermediate probability associate with the candidates. In an example, the model 106 may generate multiple probable candidates with a top-n list of candidates available as output with a probability associated with the candidate based on the parameters of the model. The system 100 may force generation of a specific candidate via the model 106, to generate the dataset 120.

The system 100 may receive a quality notation such as the notation 150 and the notation 152 for the candidates 140 and the candidate 142 respectively. The system 100 may determine a candidate pair such as the candidate 140 and the candidate 142 based on the quality notation 150 and the quality notation 152 to form pairs that have a distinction between the two candidates to evaluate models. The system 100 may choose candidate pairs that allow the system to distinguish the quality of output of the model 104 compared to other models during evaluation. For example, the system 100 may build a unit test, which includes the context 148, the candidate 140, the candidate 142 and the respective notations 150 and 152, while discarding the candidate 244 to distinguish between models with a unit test that can discern subtle changes in the quality of the candidate produced by the model. In an embodiment, the system 100 may include the likelihood of the candidate 140 and the candidate 142 being generated by the model 106 in the dataset 120. The system 100 may generate a plurality of unit tests to generate the dataset 120.

In an example, the system 100 may generate the dataset 120 based on a group of annotated candidates for a context, typically with a candidate originating from an NLG model such as model 106 in response to the context 148. In an example, the system 100 may generate the dataset 120 within a group of candidates, construct pairs of candidates of differing quality, such that one candidate is of higher quality $C_{high}$ and one candidate is of lower quality $C_{low}$.

In an embodiment, the dataset 120 may include labels that belong to categories that may not have a difference in quality between error categories, e.g., the difference between "Not Fluent" and "Not Factual" candidates, that may not allow for the candidates to be ranked. The dataset 120 may be based on pairwise comparisons rather than ranking. The dataset 120 may be built by analyzing pairs of candidates for which a quality differential is known.

The system 100 may evaluate models based on the likelihood of reproducing the mistakes in the annotated dataset 120. For example, the system 100 may determine the likelihood of the model 104 generating the $C_{high}$, and $C_{low}$ in response to the context. The system 100 may generate a likelihood of a particular sequence based a series of tokens of the context 148.

In an embodiment, the system 100 may generate the dataset 120 which includes a context 148 and candidate mapping that is appropriate for evaluating question generation task. An NLP model may be an answer-aware NLG model that generate questions based on answers as input context 148. The system 100 may generate the dataset 120 which includes unit tests for evaluating the question generating task. The system 100 may generate the unit tests based on a Quiz Design (QD) dataset which includes a question and an answer, using one or more answer-aware NLG models. For example, the system 100 may determine for a context in QD, one or more questions based on one or more models (e.g., model 106) that are answer-aware QD generation models that are part of the prior set of language models the new model is to be compared against. The context in QD may be an answer from the QD. The system 100 may receive notations associated with the context and one or more questions, that indicate the quality of the questions. For example, the system 100 may receive notations that indicate the following quality notations associated with the questions: No Error, Disfluent, Off Target and Wrong Context. For example, assume the QD has three thousand questions and the quality notations in the four categories specified above. The system 100 may determine a unit test which includes a candidate pair with the no error notation, and at least one of the other error types for a total of 2,686-unit tests in the dataset 120.

In an embodiment, the system 100 may generate the dataset 120 which includes a context and candidate mapping that is appropriate for evaluating question answering task. An NLP model may be an NLG model such as a question answering (QA model) that generates an abstractive answer in response to a question received as an input context 148. The system 100 may generate the dataset 120 which includes unit tests for evaluating the question answering task. The system 100 receives a suite of questions intended to challenge QA models. An example of a challenge or an input context 148 to a QA may be a question such as Can you sit and stand at the same time? The system 100 may receive a free-text answer generated by the QA model, and candidate responses from one or more large QA models. In addition, the system 100 may receive notations with a quality notation of 0 (incorrect), 0.5 (partially correct) or 1 (correct) and the like that correspond to the candidate responses. The system 100 may also generate tags for questions that categorizes the questions into groups, such as common sense, comparison, entity, creativity, and science.

In an embodiment, assume the challenge context 148 includes 300 questions and the candidate response from one or more NLG models 106 such as GPT are received. The system 100 may generate unit tests that include candidate pairs having a correct and incorrect answer pair. The system 100 may generate eight hundred or more test pairs which may be further organized on the basis of groups of categories.

In an embodiment, the system 100 may generate the dataset 120 which includes a context and candidate mapping that is appropriate for evaluating a summarization task. An NLP model may be an NLG model that generates an abstractive summary in response to a text received as an input context 148. The system 100 may determine the dataset 120 based on a set of input documents, i.e., input context 148 and corresponding summaries generated using the NLP model 104. The system 100 may receive quality notations that rate the summaries and classify them into categories such as the five-Point Likert scale ratings. The Likert scale ratings may rate the summaries based on consistency, coherence, fluency, and relevance. The system 100 may normalize the Likert scale ratings for attributes such as by including a high rating for an NLP model which includes a higher Likert rating from one or more quality notation sources. In an example, the quality notation may be received from multiple evaluations via an input output device.

In an example, the system 100 may receive a summary evaluation dataset (e.g., dataset 204) which includes one hundred documents with eight to nine system-generated summaries annotated with a five-Point Likert scale ratings on four general attributes {Consistency, Coherence, Fluency and Relevance.} For example, the system 100 may receive evaluation of the attributes independently in a scale from one to five. The system 100 may normalize the Likert scale notations. To normalize the quality notations, the system 100 may determine a summary is of high-quality if a majority of annotators gave the summary a score of five and is of low-quality otherwise. The system 100 may generate approximately three-thousand-unit tests in the dataset 120. The dataset 120 may include quality notations that focus on the consistency attribute and offering more specialized error categories. In an example, the system 100 may use 350 news articles, coupled with four or five corresponding summaries. The system 100 may use a quality notation which includes a hierarchical error categorization of the summaries that breaking down consistency errors into four groups: {No Error, Semantic Frame, Discourse, and Verifiability} errors. The system 100 may generate the dataset 120 by treating the {No Error} as a high-quality category, and any other errors as low-quality categories, and generate 824-unit tests or candidate pairs.

Example Workflows

Figure 3:
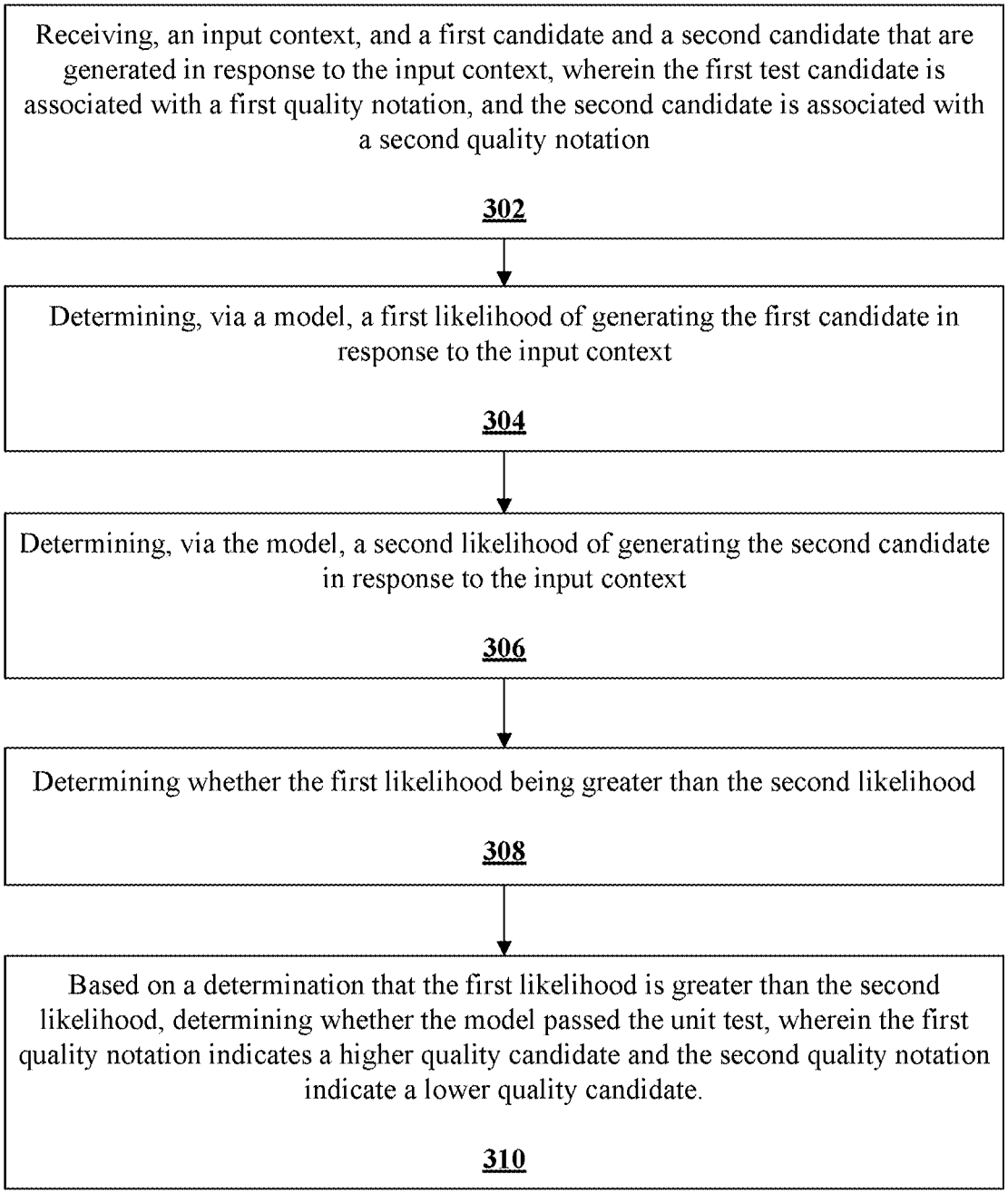
FIG. 3 is a simplified logic flow diagram illustrating an example model evaluation method using the framework shown in FIG. 1, according to embodiments described herein.

FIG. 3 is a simplified logic flow diagram illustrating an example process 300 of the model evaluation framework shown in FIGS. 1-2, according to embodiments described herein. One or more of the processes of method 300 may be implemented, at least in part, in the form of executable code stored on non-transitory, tangible, machine-readable media that when run by one or more processors may cause the one or more processors to perform one or more of the processes. In some embodiments, method 300 corresponds to the operation of the model evaluation module 530 (FIG. 5) to perform the task of evaluating the model 104.

Figure 5:
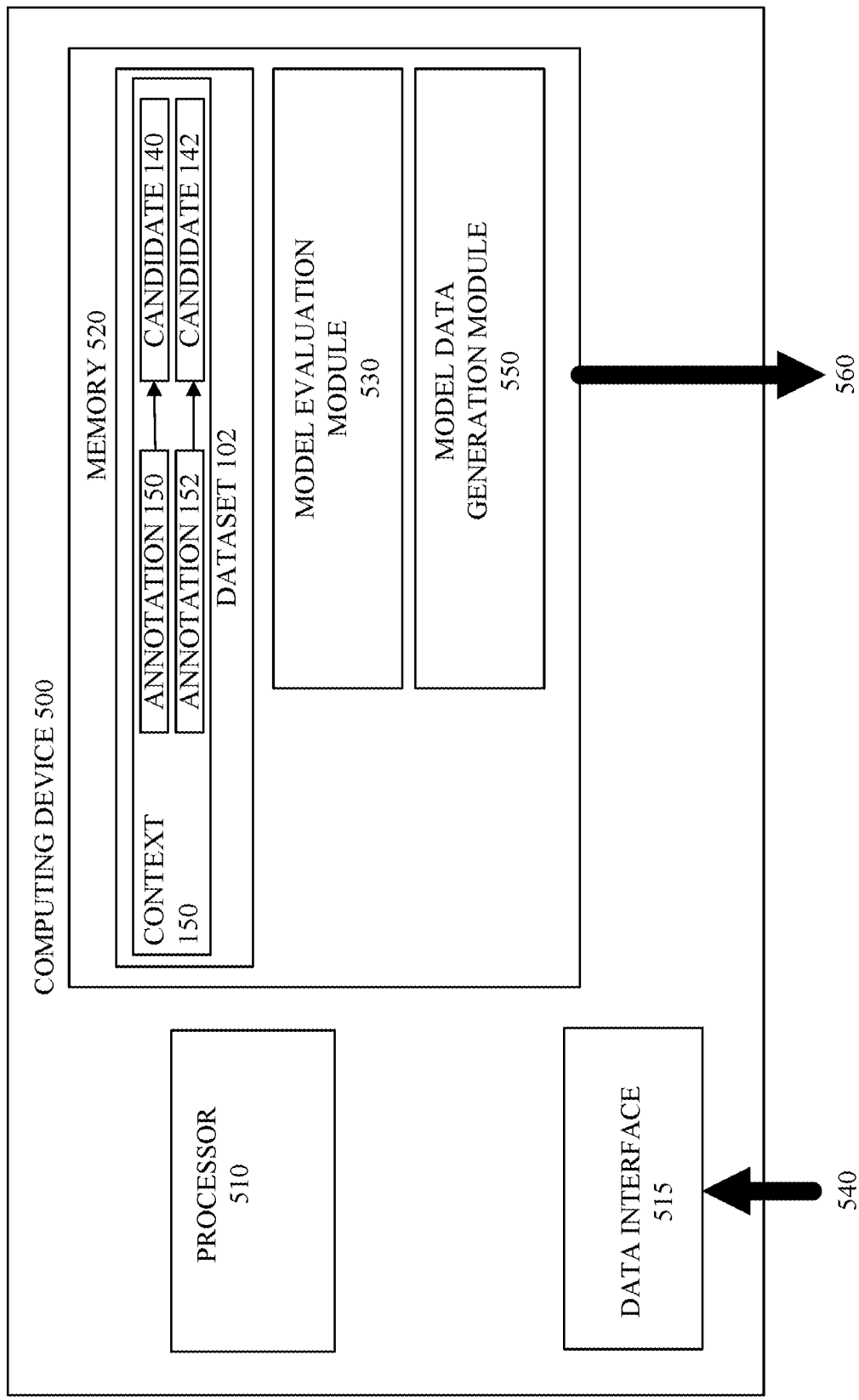
FIG. 5 is a simplified diagram illustrating an example device for performing the methods, according to embodiments described herein.

At step 302, an evaluation dataset (e.g., dataset 120 in FIG. 1) which includes a plurality of unit tests is received via a communication interface (e.g., 515 in FIG. 5). For example, the unit text may include an input context 148 and a first candidate 140 and a second candidate 142 that are generated in response to the input context 148. The first candidate 140 may have an associated quality notation 150 and the second candidate may have an associated quality notation 152.

The first quality notation 150 and the second quality notation 152 may be selected to allow near negative distinction, i.e., to distinguish between different natural language generation candidates with differing quality to enable comparison of the output of the model 104. In an example, the first quality notation 150 may be associated with a no error categorization and the second quality notation 152 may be associated with at least one of a disfluent, an off-target and a wrong context error categorization. The model evaluation module 530 may use such categorization to determine areas in which the model does better than other models with an insight into specific errors and the likelihood of specific errors in the responses generated by the model 104. In an embodiment, the first quality notation may be associated with a no error categorization and the second quality notation is associated with at least one of a semantic frame, a discourse, and a verifiability error categorization.

In an example, the first quality notation 150 may be associated with a correct categorization and the second quality notation 152 is associated with an incorrect categorization. In an example, the first quality notation 150 and the second quality notation 152 may indicate the quality of the result in a text summarization task. In an example, the first quality notation 150 and the second quality notation 152 may indicate the quality of the result in a question generation task. In an example, first quality notation 150 and the second quality notation 152 may indicate the quality of the result in an abstractive summary generation task.

At step 304, a first likelihood of generating the first candidate in response to the input context, may be determined via the model (e.g., model 104 in FIG. 1.) For example, the model evaluation module 530 may determine the probability of the first candidate 140 being generated in response to the input context 148. The model evaluation module 530 may generate a sequence of tokens associated with the input context 148. The model evaluation module 530 may determine an intermediate probability associated with the first candidate 140 in response to the sequence of tokens fed to the model 104, and determine the first likelihood (e.g., first likelihood 160 in FIG. 1) based on the intermediate probability.

At step 306, a second likelihood of generating the second candidate in response to the input context, may be determined via the model (e.g., model 104 in FIG. 1.) For example, the model evaluation module 530 may determine the probability of the second candidate 142 being generated in response to the input context 148. The model evaluation module 530 may generate a sequence of tokens based on the input context 148. The model evaluation module 530 may determine an intermediate probability associated with the first candidate 140 in response to the sequence of tokens fed to the model 104, and determine the first likelihood (e.g., first likelihood 160 in FIG. 1) based on the intermediate probability.

At step 308, determine whether the first likelihood is greater than the second likelihood via the model (e.g., model 104 in FIG. 1.) in response to the input context (e.g., input context 148.) For example, the model evaluation module 530 may determine whether the model 104 is more likely to product the first candidate 140 or the second candidate 142 in response to the input context 148.

At step 310, determine whether the model passed the unit test based on the determination that first likelihood is greater than the second likelihood. For example, the model evaluation module 530 may determine that as the model 104 passed the unit test based on the probability of the first candidate 140 being generated is greater than the probability of the second candidate 142 being generated in response to the input context 148. The model evaluation module 530 may thus determine whether the model 104 produces candidates with the first quality notation which indicates higher quality candidates or whether it produces the second candidate 142 with the second quality notation.

The model evaluation module 530 may further perform these steps with respect to the plurality of unit tests in the dataset 120. The model evaluation module 530 may increment a test pass count in response to the determined first likelihood being greater than the second likelihood in unit tests selected from the plurality of unit tests. The model evaluation module 530 may determine an aggregate pass rate based on the determined total count of test passes, the aggregate pass rate indicating whether the model produces candidates that correspond to the first quality notation.

FIG. 4 is a simplified logic flow diagram illustrating an example process 420 of a dataset generation, according to embodiments described herein. One or more of the processes of method 420 may be implemented, at least in part, in the form of executable code stored on non-transitory, tangible, machine-readable media that when run by one or more processors may cause the one or more processors to perform one or more of the processes. In some embodiments, method 420 corresponds to the operation of the model dataset generation module 550 (FIG. 5) to perform the task of generating unit tests for evaluating models.

At step 402, the model dataset generation module 550 may determine, via a generating model (e.g., the model 106 in FIG. 2,) a likelihood of generating a plurality of candidates (e.g., candidate 140, 142, 240 in FIG. 2) including the first candidate (e.g., candidate 140, 142, 240 in FIG. 2) and the second candidate (candidate 142 in FIG. 2) in response to the input context (e.g., input text 148 in FIG. 2). For example, the module 450 may use a dataset 202 which includes a context 148. The context 148 may be selected from prior datasets that have quality notations to generate unit tests that can then be used to compare models.

At step 404, module 450 may receive a first quality notation (e.g., 150) associated with the first candidate 140. For example, the system 100 may receive the first quality notation (e.g., 150) from an entity such as a user. The system 100 may determine the first quality notation based on a human annotation dataset that stores the responses and the quality notations associated with the first candidate 140 in a database or a text document.

At step 406, module 450 may receive the second quality notation (e.g., 152) associated with the second candidate 142. For example, the system 100 may receive the second quality notation (e.g., 150) from an entity such as a user. The system 100 may determine the first quality notation based on a human annotation dataset that stores the responses and the quality notations associated with the first candidate 140 in a database or a text document.

At step 408, module 450 may determine whether the first candidate 140 and the second candidate 142 provide a near negative distinction, the near negative distinction indicating a difference in quality of output of the generating model in response to the input context 148 that may be used to evaluate a model. The module 450 may choose candidates that are distinguishable and are in different error categories to build the unit test for evaluating the models.

At step 410, module 450 may generate the unit text that associates the input context 148 with first candidate 140 having the first quality notation 150 and the second candidate 142 having the second quality notation 152, such that the first candidate 140 and the second candidate 142 provide a near-negative distinction to allow evaluation of a model.

Computing Environment

FIG. 5 is a simplified diagram of a computing device that implements the generation augmented iterative ranking for knowledge base question answering, according to some embodiments described herein. As shown in FIG. 5, computing device 500 includes a processor 510 coupled to memory 520. Operation of computing device 500 is controlled by processor 510. And although computing device 500 is shown with only one processor 510, it is understood that processor 510 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 500. Computing device 500 may be implemented as a stand-alone subsystem, as a board added to a computing device, and/or as a virtual machine.

Memory 520 may be used to store software executed by computing device 500 and/or one or more data structures used during operation of computing device 500. Memory 520 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip, or cartridge, and/or any other medium from which a processor or computer is adapted to read.

Processor 510 and/or memory 520 may be arranged in any suitable physical arrangement. In some embodiments, processor 510 and/or memory 520 may be implemented on a same board, in a same package (e.g., system-in-package), on a same chip (e.g., system-on-chip), and/or the like. In some embodiments, processor 510 and/or memory 520 may include distributed, virtualized, and/or containerized computing resources. Consistent with such embodiments, processor 510 and/or memory 520 may be located in one or more data centers and/or cloud computing facilities.

In some examples, memory 520 may include non-transitory, tangible, machine readable media which includes executable code that when run by one or more processors (e.g., processor 510) may cause the one or more processors to perform the methods described in further detail herein. For example, as shown, memory 520 includes instructions for a model evaluation module 530 that may be used to implement and/or emulate the systems and models, and/or to implement any of the methods described further herein. In some examples, the model evaluation module 530, may receive an input 540, e.g., such as a model 104 and an evaluation dataset 120, via a data interface 515. The data interface 515 may be any of a user interface that receives a dataset 120 or an input from an entity. The model evaluation module 530 may generate an output 552, such as an evaluation result of a model (e.g., the model 104) at the input 540.

In one embodiment, memory 520 may store an evaluation dataset, such as the evaluation dataset 120 described in FIG. 1. In another embodiment, processor 510 may access the evaluation dataset at a remote server via the communication interface 515.

Some examples of computing devices, such as computing device 500 may include non-transitory, tangible, machine readable media that include executable code that when run by one or more processors (e.g., processor 510) may cause the one or more processors to perform the processes of methods 300-400 discussed in relation to FIGS. 3-4. Some common forms of machine readable media that may include the processes of methods 300-400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

In some embodiments, the memory may include a model dataset generation module 550 to generate the dataset as described with reference to FIG. 2.

In one implementation, the model evaluation module 530 and the model dataset generation module 550 and its submodules may be implemented via software, hardware and/or a combination thereof.

Example Performance

As shown in FIG. 6, the system 100 may provide verification of results when comparing models on three NLG tasks when compared to other evaluation methods. In an example, as shown in FIG. 6 the system 100 may compare the models based on the evaluation dataset 120 to standard n-gram based evaluation metrics, BLEU, ROUGE, METEOR, as well as more recent Transformer-based metrics: BERT Score, BART Score and QuestEval. In an example, the system 100 may evaluate models present in the notation datasets that have been open-sourced because the testing methodology depends on a version of the model to compute candidate likelihoods. (See., *Proceedings of the 40th annual meeting of the Association for Computational Linguistics*, Kishore et al., at pp. 311-318, See also, *Text summarization branches out,* 2004 Chin-Yew et al., at pp. 74-81, See also, *Proceedings of the acl workshop on intrinsic and extrinsic evaluation measures for machine translation and/or summarization,* 2005, Satanjeev et al., at pp 65-72, See also, *Proceedings of the* 2021 *Conference on Empirical Methods in Natural Language Processing,* 2021, Thomas et al., at pp. 6594-6604, See also, *BARTScore: Evaluating Generated Text as Text Generation*, Weizhe et al arXiv:2106.11520, 2021)

With respect to Question Generation, as shown in FIG. 6 the system 100 may evaluate the seven models present in the notations dataset, with separate verification experiments run on three error types. With respect to QA, the system 100 may evaluate the three of the four available models with respect to the different question categories.

For Summarization, as shown in FIG. 6, the system 100 may include verification experiment that include five summarizers such as M9, M17, M20, M22, M23, with tests run on the four summarization aspects.

The system 100 may generate a summary of the verification results as shown in FIG. 7, where the NND method of an embodiment and the results from other methods may be compared. In an embodiment of the current method, achieving the highest correlation on five of the six assessments. In an example, the system 100 may determine the improvements in correlation are stronger on the QG and generative QA tasks than Summarization, on which ROUGE, BARTScore, and QuestEval achieve strong performance.

In an example, the system 100 may evaluate the results based on the difference between NND and reference-based metrics. Specifically, the system 100 may use the property that reference-based metrics score a generator by establishing a similarity between the model's candidate outputs and human-written references. For example, the system 100 may consider that NND is reference-less and relies on notations of a several model's candidate outputs received from an entity to evaluate models. The system 100 may also use near negatives, to determine whether a model is likely to avoid them, provides useful signal that leads to model evaluation that is more robust compared to current methods of evaluating models.

Figure 8:
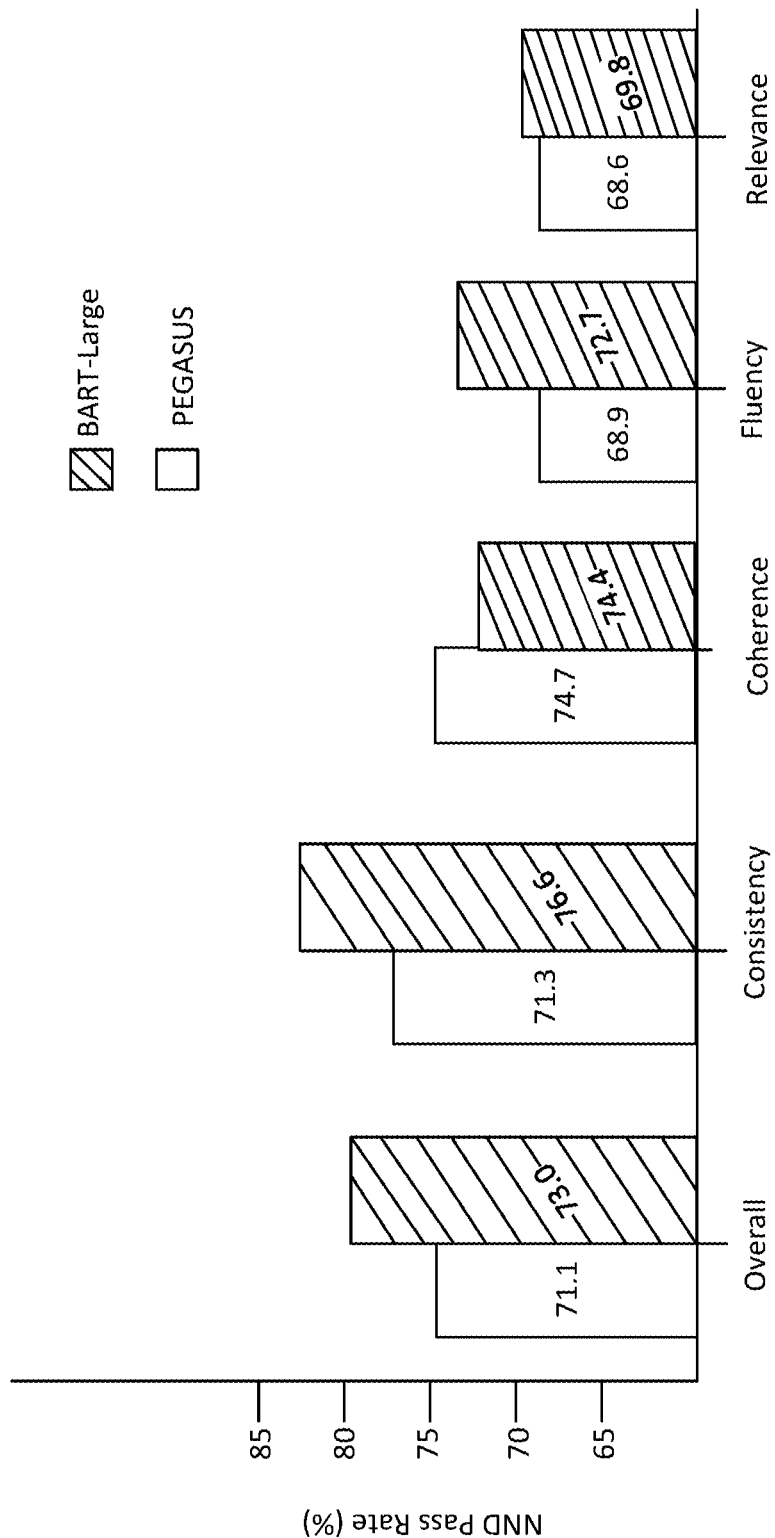

As shown in FIG. 8, the system 100 may use the NND framework in practical situations and assume that NND pass rates provide quality estimates of model ranks and performance gaps between models.

As shown in FIG. 8, the system 100 may apply NND evaluation in several practical situations and showcase different use-cases of the framework: extrapolating the performance of unseen models, fine-grained model comparison, studying model scaling effects, and evaluation during model training.

In Quiz Design, as shown in FIG. 8 the system 100 may not include the MixQG-3B model in the notations due to latency of the model with respect to the interface. (See., *Findings of the North American Chapter of the Association for Computational Linguistics: NAACL* 2022, Lidiya et al.) Further, the system 100 may use newer QGen models that are available. (See, *Proceedings of the 58th Annual Meeting of the Association for Computational Linguistics*: Fabbri et al. 2020, pp. 4508-4513) The system 100 may leverage NND's ability to provide category-specific estimates of performance to extrapolate how these unseen models would have performed in the Quiz Design Study.

The system 100 may run NND unit tests for the seven models included in the study, as well as the unseen models. The system 100 may summarize the results are summarized in Table shown in Fig The system 100 may determine that three novel models evaluated scoring three of the best four overall NND pass rates. In an example, the system 100 may determine the MixQG-3B achieves the highest performance overall, seeing a total improvement of 2% when compared to MixQG-L, the best performer at the time of the study, with gains on the three error categories. In an example, the system 100 may determine Macaw models achieve the strongest performance in {Disfluency}, but lower performance on {Off Target} and {Wrong Context} lead to lower performance overall.

The system 100 may based on the results use NND to reuse human evaluation datasets by projecting model performance a posteriori.

The system 100 may determine that the BART-Large and PEGASUS models are close contenders for top performance in summarization. For example, the system 100 may determine that the two models are virtually tied in terms of ROUGE-1 score on the CNN/DM test set with a variation of less than 0.1 point. (See, *Proceedings of the 2021 Conference of the North American Chapter of the Association for Computational Linguistics: Human Language Technologies,* 2021 Artidoro et al, pp. 4812-4829, See, *Pegasus: Pre-training with extracted gap-sentences for abstractive summarization,* 2020 Jingqing et al.)

Figure 9:
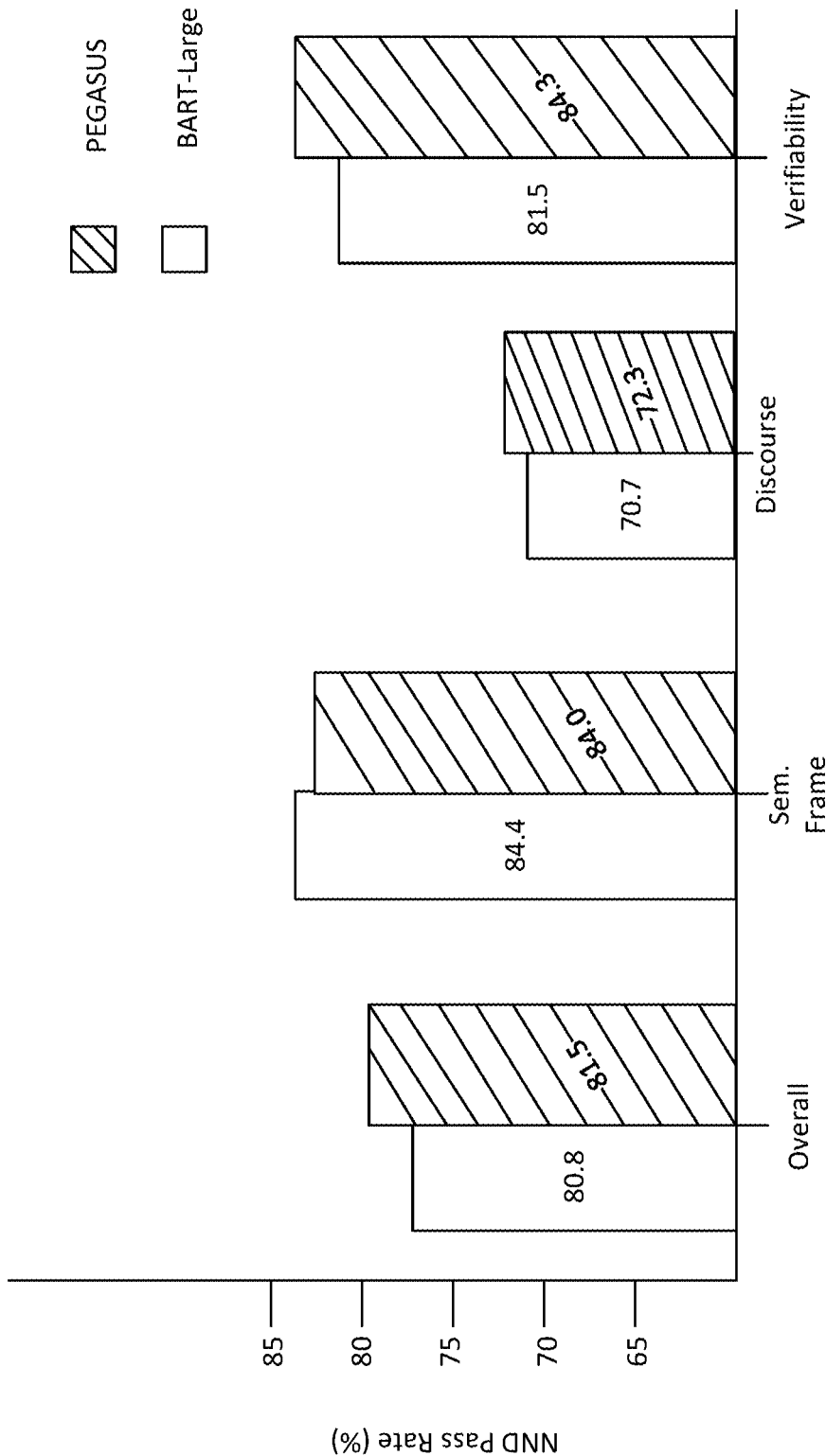
Figure 10:
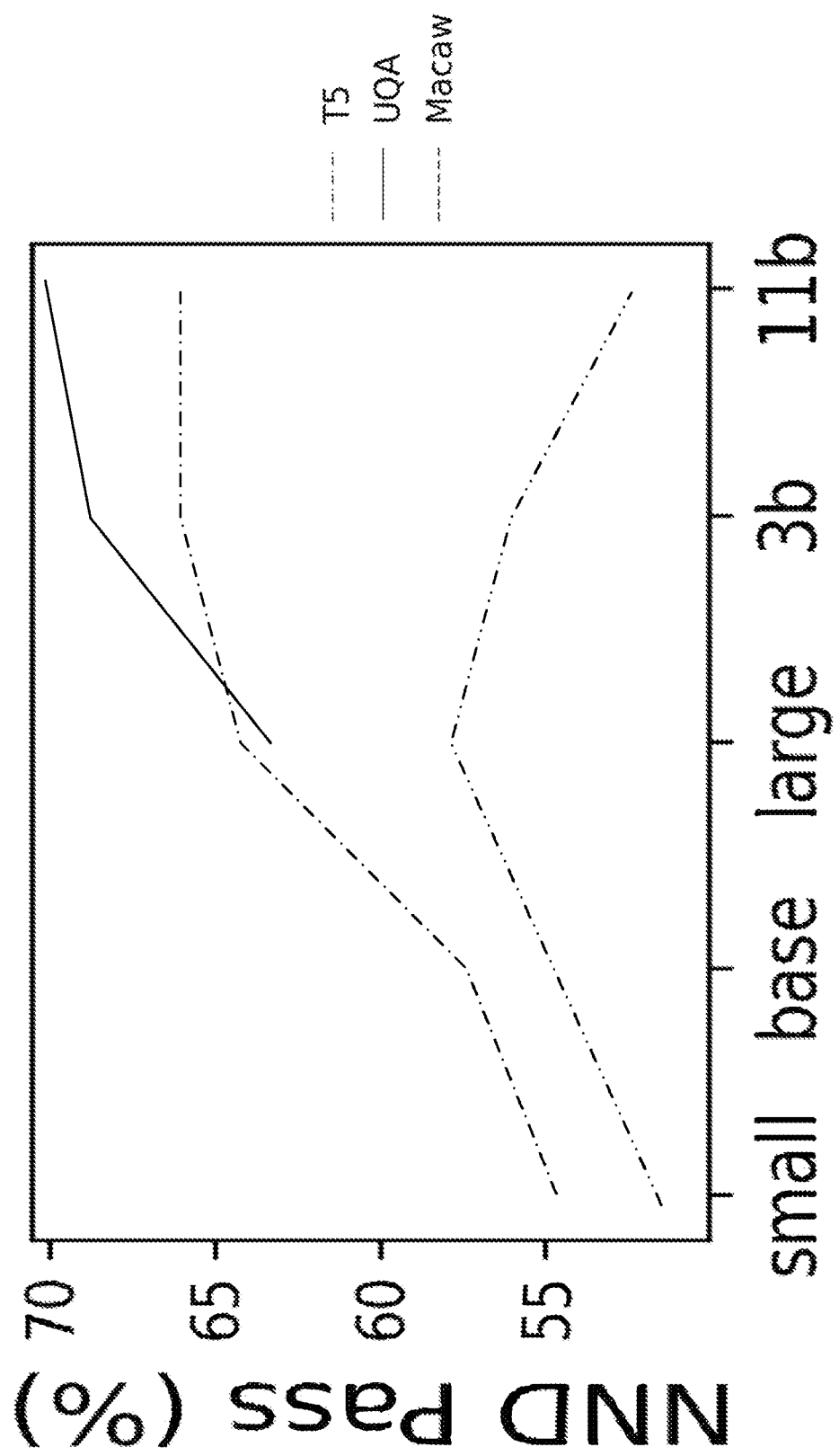
Figure 11:
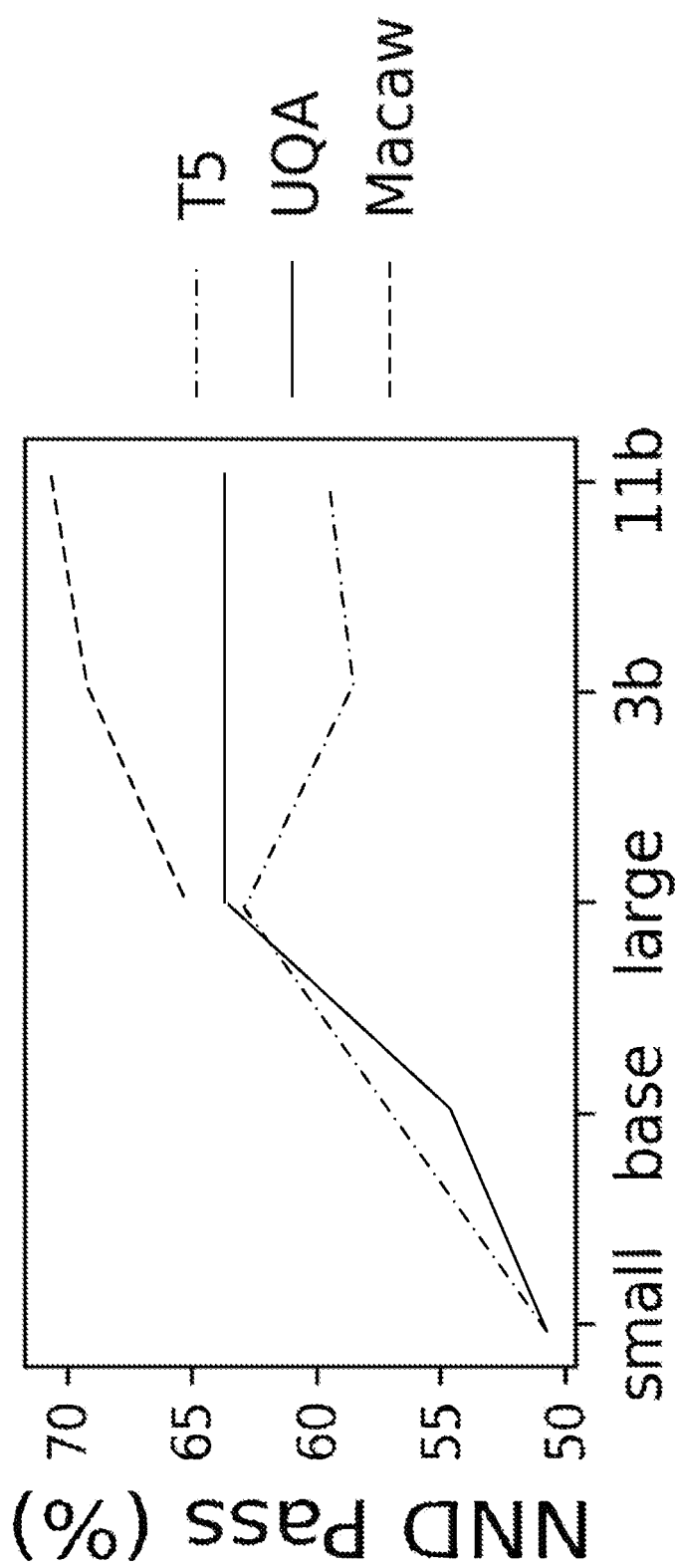
Figure 12:
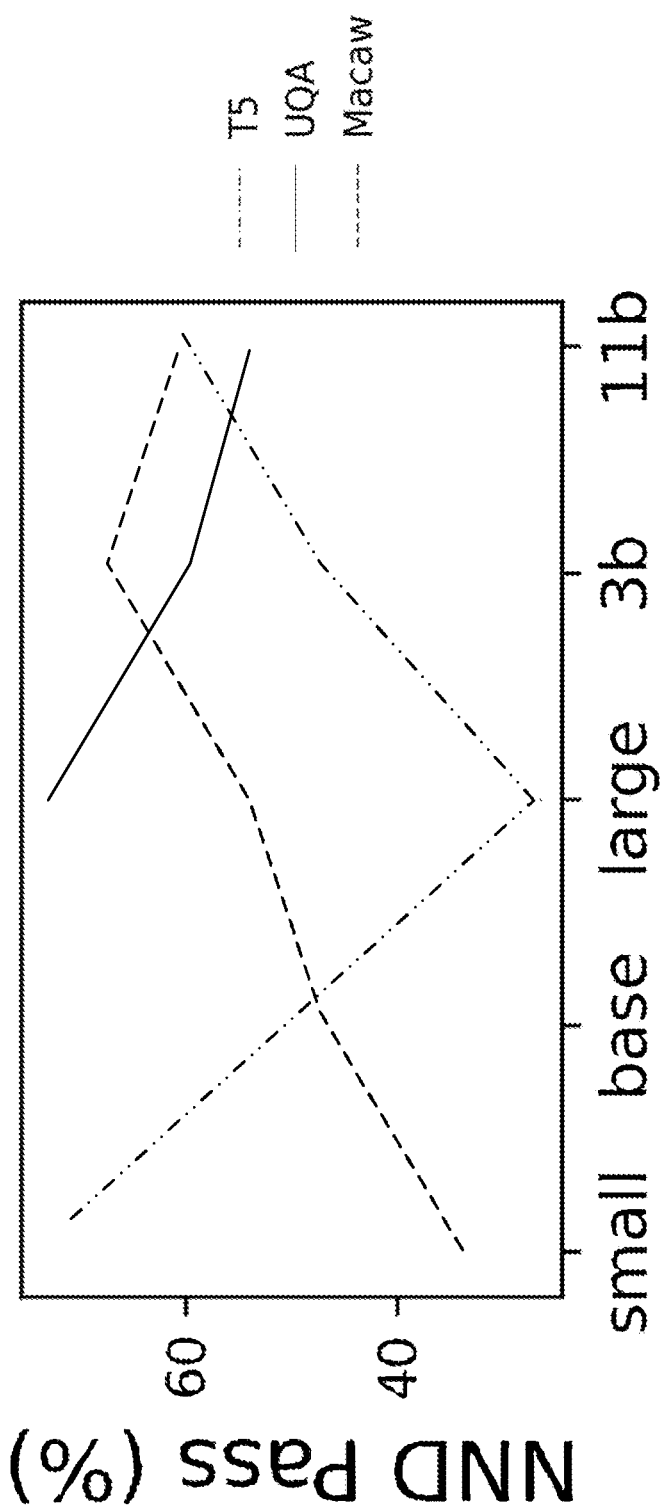
Figure 13:
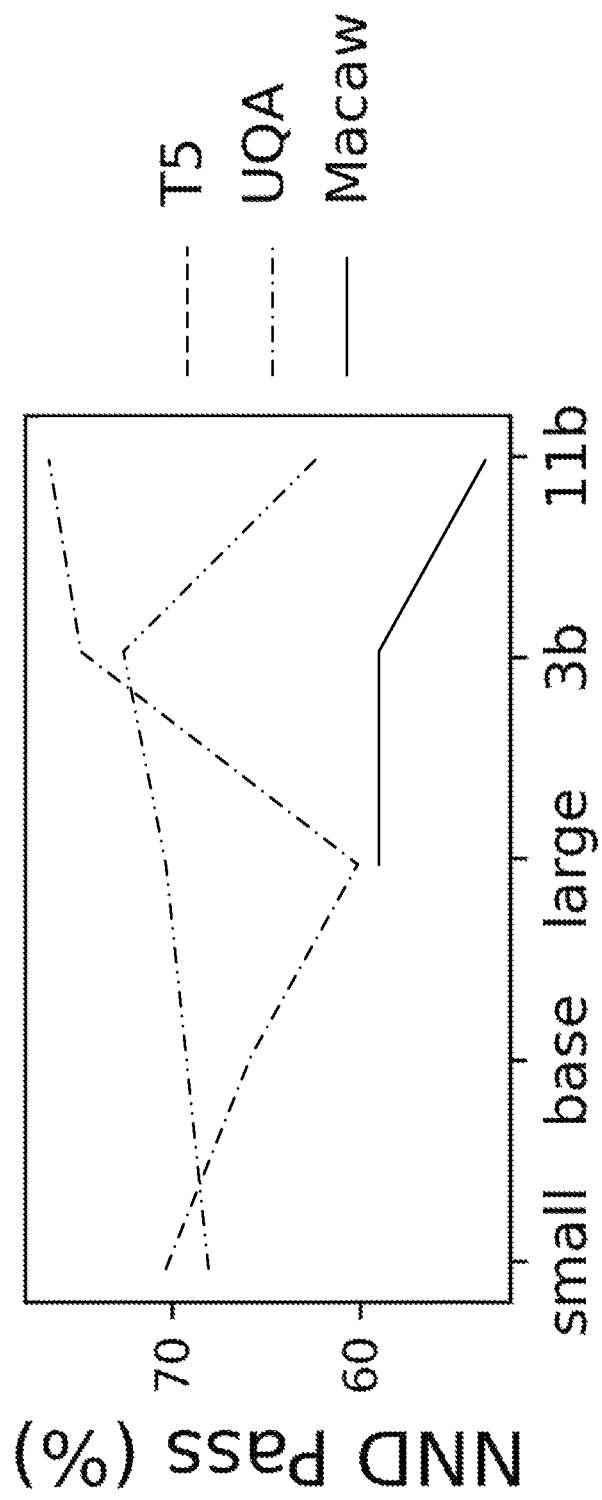
Figure 14:
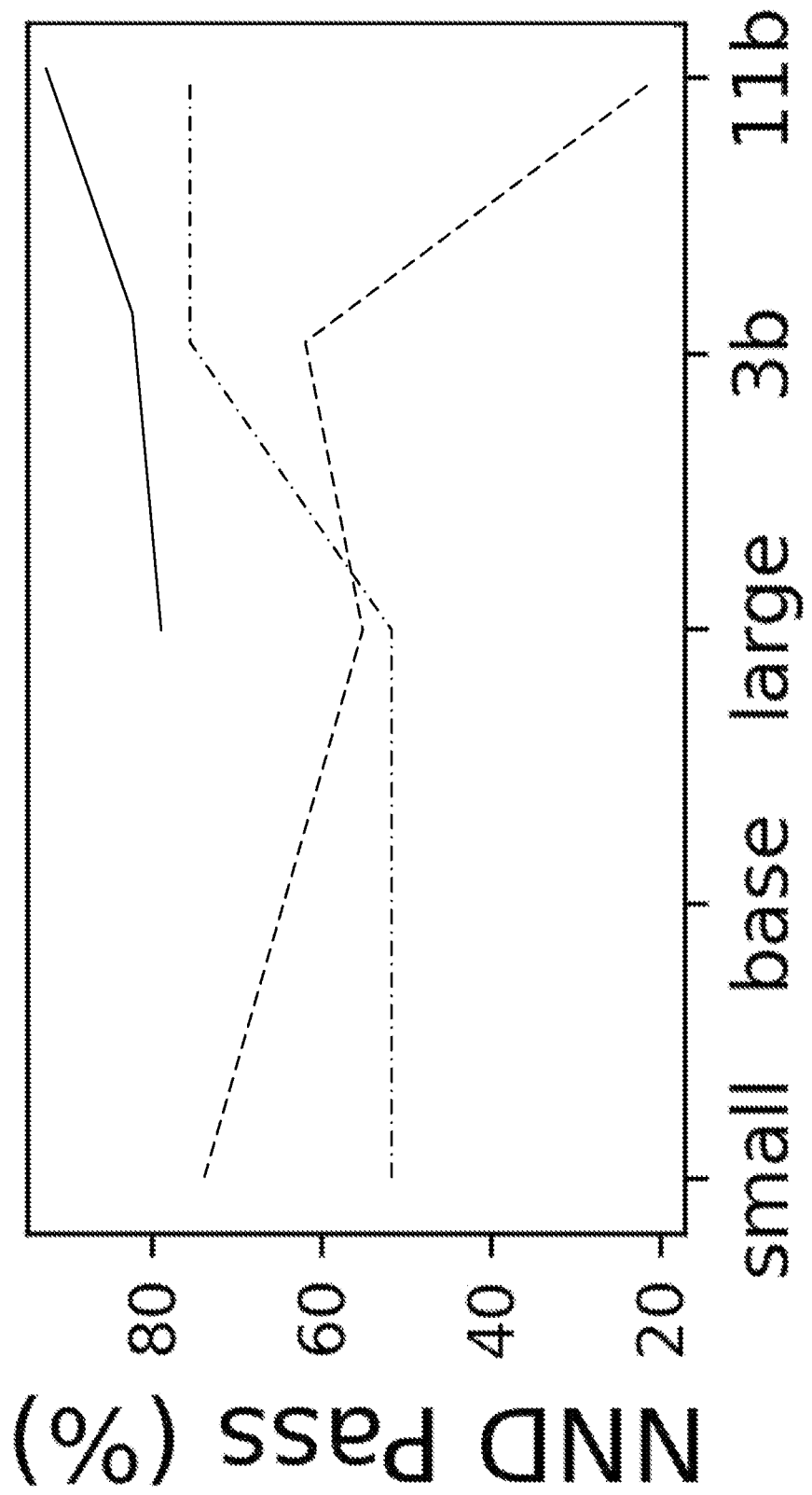
Figure 15:
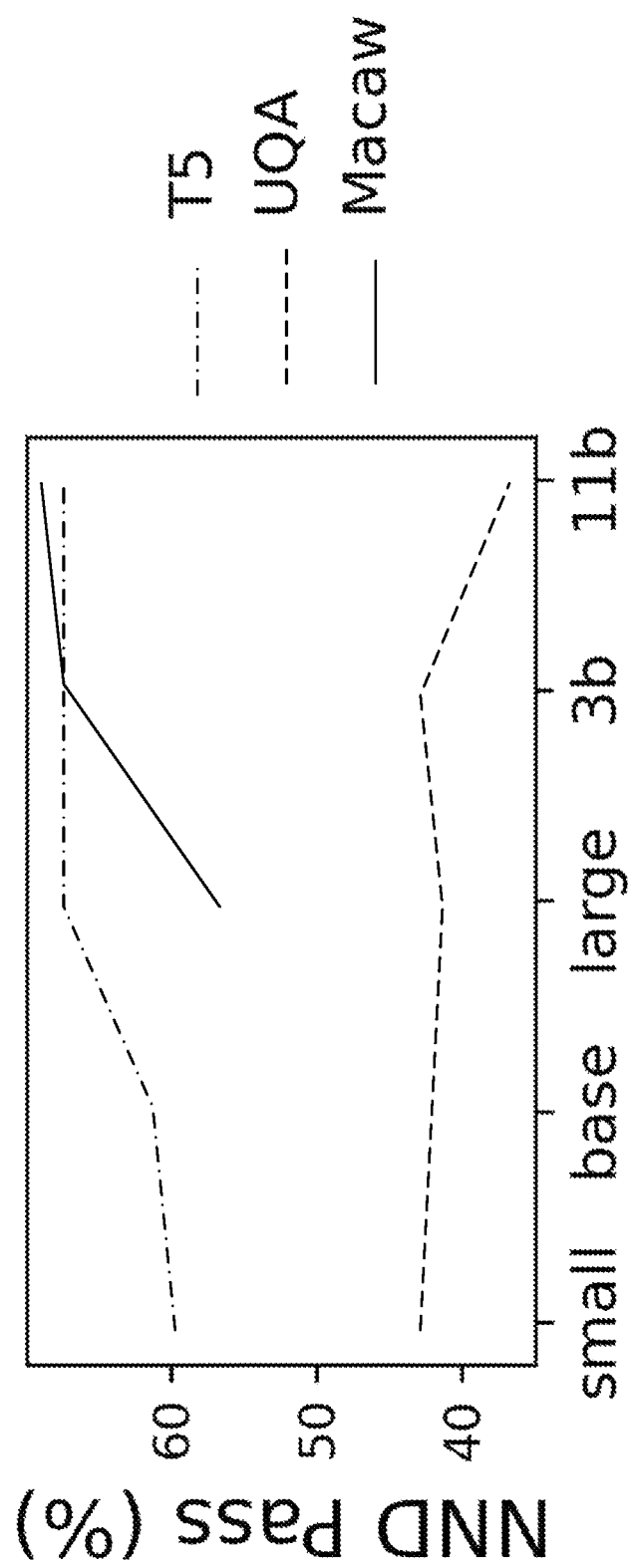
Figure 16:
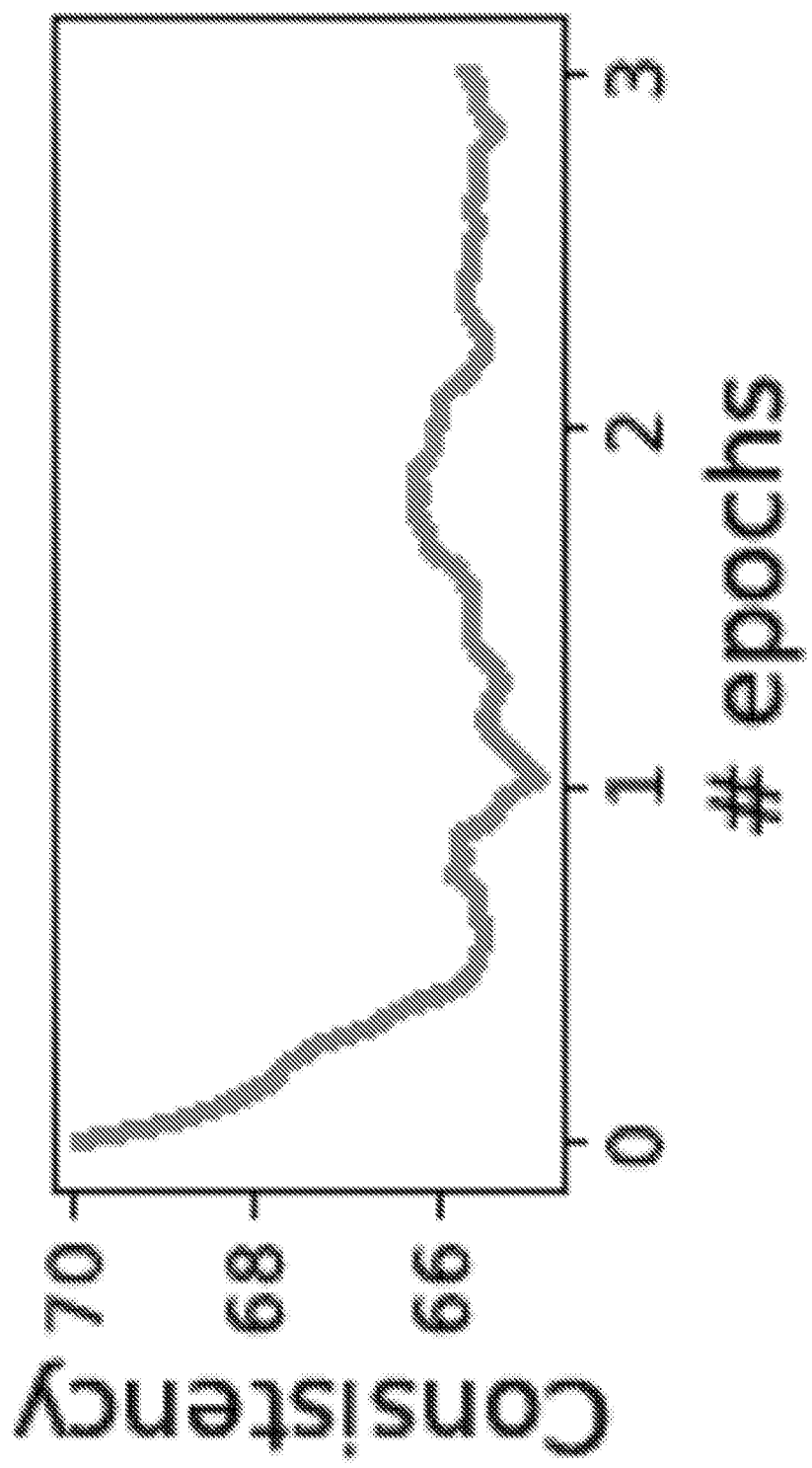
Figure 17:
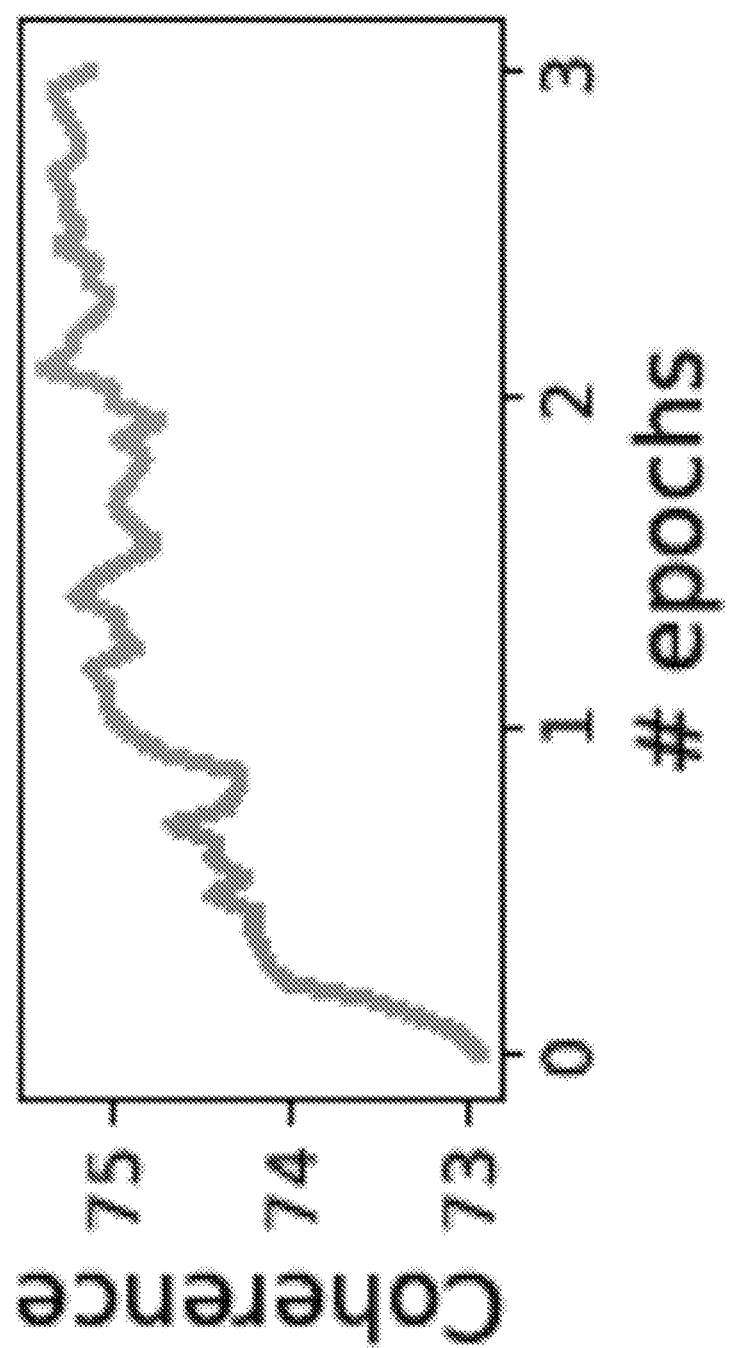
Figure 18:
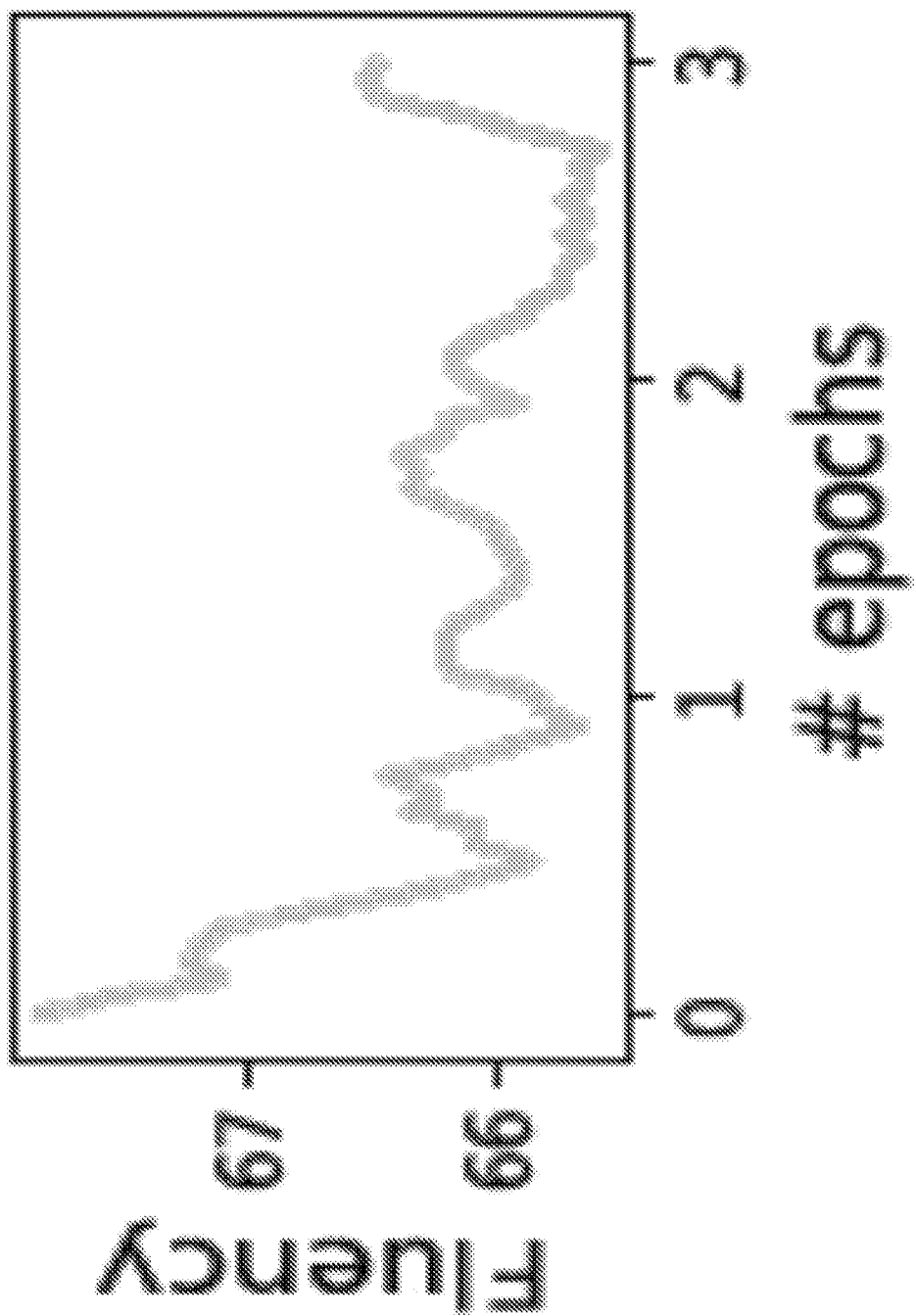
Figure 19:
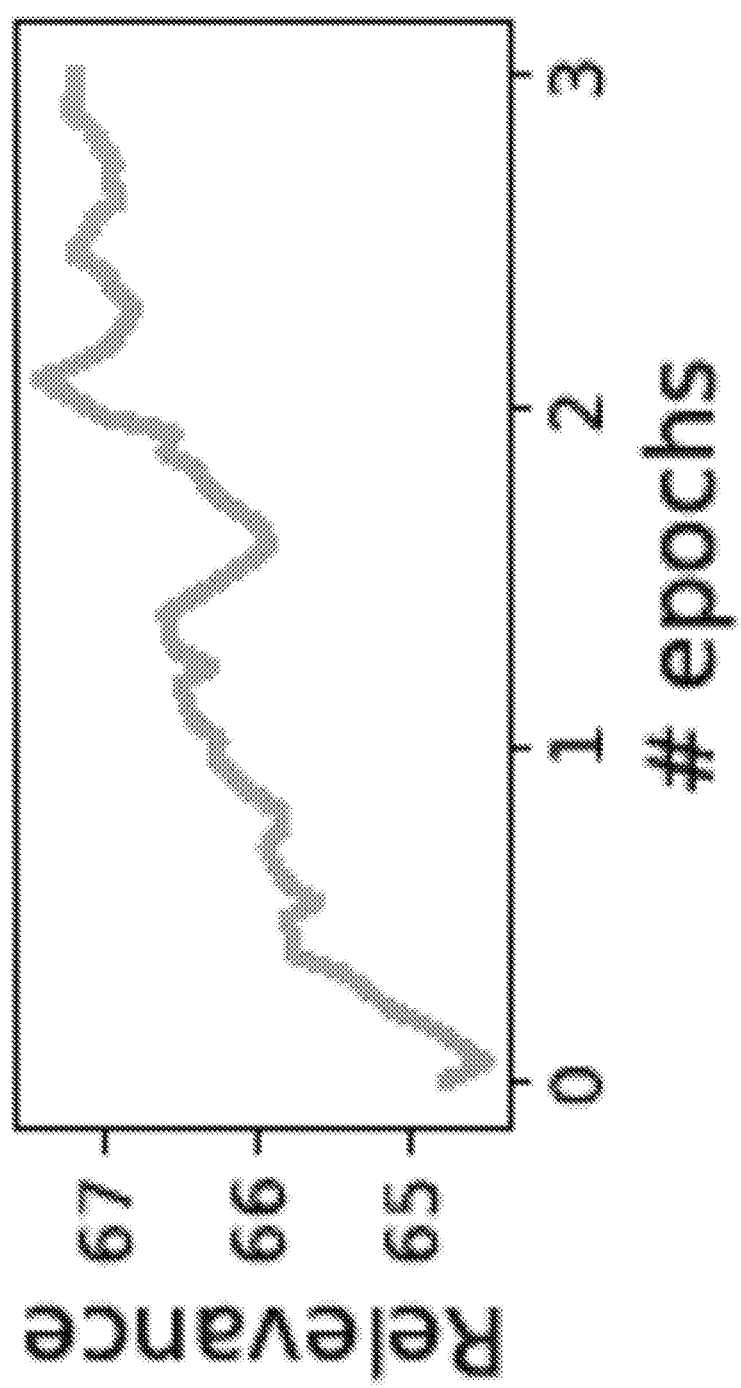

To gain specific insights into the differences between the models, the system 100 may run NND experiments with models using the general NND test set based on the SummEval notations, as well as the factual consistency focused FRANK notations. FIG. 9 shows a tabulation of the results.

On the SummEval test set, as shown in FIG. 9 the system 100 may determine that PEGASUS narrowly outperforms BART overall, owing to four to five percent gains on the consistency and fluency aspects. The system 100 may determine the performance on the coherence and relevance aspects may be narrower, with BART topping coherence, and PEGASUS with a slight edge in relevance.

The system 100 may determine based on the SummEval results that the FRANK NND results are authenticated, because PEGASUS also outperforms BART overall, confirming that PEGASUS is better at avoiding factual errors than BART. (See also, *BARTScore: Evaluating Generated Text as Text Generation,* 2021, Weizhe et al) The system 100 may determine that this more precise error categorization PEGAS model may not always outperform the BART-Large by achieving higher pass rate on the Semantic Frame errors.

The system 100 may based on the NND results confirm that the two models' performance are close, with overall NND pass rates within two percent of each other, yet reveal some subtlety in the specific strengths and weaknesses of various models. The system 100 may determine depending on the application, certain attributes might be of more or less importance, and NND could inform a user on which model to select.

The system 100 may receive a dataset in an embodiment which includes annotated text outputs from the largest models available for model families. In such instances, the system 100 may provide a warning of the effect of model size on performance.

The system 100 may test NND unit tests for various model sizes available for three families of QA models: T5 finetuned on Natural Questions (Small, Large, 3B, 11B), Unified-QA (Small, Base, Large, 3B, 11B), and Macaw (Large, 3B, 11B), with results summarized in FIGS. 10-15. (See., *Journal of Machine Learning Research,* 2020, Colin et. al. pp. 1-67)

The system 100 may determine that increasing model size leads to gradual increases in performance for the UnifiedQA and Macaw models. The system 100 may determine that for T5, performance peaks with the T5-Large. The system 100 may determine that overall, the T5 family underperforms UnifiedQA and Macaw. (See., *Findings of the Association for Computational Linguistics*: EMNLP, 2020, pp. 1896-1907, See also, *General-purpose question-answering with macaw,* arXiv 2109.02593, 2021, Oyvind et. al.)

The system 100 may determine that with respect to UnifiedQA and Macaw, model performance increases steadily on three question categories: Common Sense, Creativity and Science, but stagnates or decreases on the Comprehension and Entity categories.

The system 100 may determine based on NND unit trials that performance tends to improve with model size increase, the trends vary widely by question category. The system 100 may determine a particular question category in mind might benefit from a smaller model size.

The system 100 may detect consistency, fluency, coherence, and relevance errors based on SummEval NND unit tests at checkpoints during training. The system 100 may determine based on NND unit tests comparisons across models. The system 100 may use the NND unit tests to inspect a model during training. The system 100 may train a BART-base model on the CNN/DM dataset using teacher forcing with cross entropy loss for three epochs. The system 100 may perform an NND unit test of the latest model checkpoint at or around two thousand training steps, using the SummEval NND test pairs.

As shown in FIGS. 16-19, the system 100 may determine that the model's ability to detect consistency and fluency errors decreases during training, with NND pass rates decreasing by two to four. The system 100 may determine that this finding mirrors analysis on training dynamics in summarization, which indicates that models become less factual in later stages of the training process. The system 100 may determine that model performance on coherence and relevance errors steadily increases during training.

The system 100 may determine that the trends could be explained by the model becoming better at summarization-specific skills, such as content selection (relevance) and ordering (coherence) at the cost of factual consistency and general fluency.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of evaluating a model via Near-Negative Distinction (NND), the method comprising:
   receiving, via a communication interface, an evaluation dataset comprising a plurality of unit tests, the unit tests having:
      an input context, and
      a first candidate and a second candidate that are generated in response to the input context, wherein the first candidate is associated with a first quality notation, and the second candidate is associated with a second quality notation;
   determining, via a model, a first likelihood of generating the first candidate in response to the input context;
   determining, via the model, a second likelihood of generating the second candidate in response to the input context;
   determining a count of unit tests in the evaluation dataset where the model passed;
   determining an aggregate pass rate based on the determined count of unit tests, the aggregate pass rate indicating whether the model produces candidates that correspond to the first quality notation;
   determining whether the first likelihood is greater than the second likelihood based on the determined aggregate pass rate; and
   based on a determination that the first likelihood is greater than the second likelihood, determining whether the model passed a unit test in the evaluation dataset, wherein the first quality notation is associated with a higher quality candidate and the second quality notation is associated with a lower quality candidate.

2. The method of claim 1, wherein generating the unit tests comprises:
   determining via a generating model, a likelihood of generating a plurality of candidates including the first candidate and the second candidate in response to the input context;
   receiving the first quality notation associated with the first candidate;
   receiving the second quality notation associated with the second candidate;
   determining whether the first candidate and the second candidate provide a near negative distinction, the near negative distinction indicating a difference in quality of output of the generating model in response to the input context; and
   generating a unit text that associates the input context with the first candidate having the first quality notation and the second candidate having the second quality notation, such that the first candidate and the second candidate provide a near-negative distinction to evaluate the model.

3. The method of claim 1, wherein the first quality notation is associated with a no error categorization and the second quality notation is associated with at least one of a disfluent, an off-target and a wrong context error categorization.

4. The method of claim 1, wherein the first quality notation is associated with a no error categorization and the second quality notation is associated with at least one of a semantic frame, a discourse, and a verifiability error categorization.

5. The method of claim 1, wherein the first quality notation is associated with a correct categorization and the second quality notation is associated with an incorrect categorization.

6. The method of claim 1, wherein the first quality notation and the second quality notation are parameters associated with candidates in a text summarization task.

7. The method of claim 1, wherein the first quality notation and the second quality notation are parameters associated with candidates in a question generation task.

8. The method of claim 1, wherein the first quality notation and the second quality notation are parameters associated with candidates in an abstractive summary generation task.

9. The method of claim 1, wherein to determine the first likelihood of generating the first candidate in response to the input context, the method further comprises:
   determining a sequence of tokens associated with the input context;
   determining an intermediate probability associated with the first candidate in response to the sequence of tokens sent to an input of the model; and
   determining the first likelihood based on the intermediate probability.

10. The method of claim 9, wherein to determine the intermediate probability, the method further comprises:
   sending the sequence of tokens to the input of the model a token at a time; and
   obtaining the intermediate probability associated with intermediate candidates in response to a partial sequence of tokens.

11. A system for evaluating a model, the system comprising:
   a communication interface receiving an evaluation dataset comprising a plurality of unit tests, the unit tests having:
      an input context, and
      a first candidate and a second candidate that are generated in response to the input context, wherein the first candidate is associated with a first quality notation, and the second candidate is associated with a second quality notation;
   a memory storing a plurality of processor-executable instructions; and
   a processor reading and executing the instructions from the memory to perform operations comprising:
      determine, via a model, a first likelihood of generating the first candidate in response to the input context;
      determine, via the model, a second likelihood of generating the second candidate in response to the input context;
      determining a count of unit tests in the evaluation dataset where the model passed;
      determining an aggregate pass rate based on the determined count of unit tests, the aggregate pass rate indicating whether the model produces candidates that correspond to the first quality notation;
      determine whether the first likelihood being greater than the second likelihood base on the aggregate pass rate; and
      based on a determination that the first likelihood is greater than the second likelihood, determining whether the model passed a unit test in the evaluation dataset, wherein the first quality notation is associated with a higher quality candidate and the second quality notation is associated with a lower quality candidate.

12. The system of claim 11, wherein generating the unit tests comprises:
   determine via a generating model, a likelihood of generating a plurality of candidates including the first candidate and the second candidate in response to the input context;
   receive the first quality notation associated with the first candidate;
   receive the second quality notation associated with the second candidate;
   determine whether the first candidate and the second candidate provide a near negative distinction, the near negative distinction indicating a difference in quality of output of the generating model in response to the input context; and
   generate a unit text that associates the input context with the first candidate having the first quality notation and the second candidate having the second quality notation.

13. The system of claim 11, wherein the first quality notation is associated with a no error categorization and the second quality notation is associated with at least one of a disfluent, an off-target and a wrong context error categorization.

14. The system of claim 11, wherein the first quality notation is associated with a no error categorization and the second quality notation is associated with at least one of a semantic frame, a discourse, and a verifiability error categorization.

15. The system of claim 11, wherein the first quality notation is associated with a correct categorization and the second quality notation is associated with an incorrect categorization.

16. The system of claim 11, wherein the first quality notation and the second quality notation are parameters associated with candidates in a text summarization task.

17. The system of claim 11, wherein the first quality notation and the second quality notation are parameters associated with candidates in a question generation task.

18. A processor-readable non-transitory storage medium storing a plurality of processor-executable instructions for knowledge base question answering, the instructions being executed by one or more processors to perform operations comprising:
   receiving an evaluation dataset comprising a plurality of unit tests, the unit tests having:
      an input context, and
      a first candidate and a second candidate that are generated in response to the input context, wherein the first candidate is associated with a first quality notation, and the second candidate is associated with a second quality notation;
   determining, via a model, a first likelihood of generating the first candidate in response to the input context;
   determining, via the model, a second likelihood of generating the second candidate in response to the input context;
   determining a count of unit tests in the evaluation dataset where the model passed;
   determining an aggregate pass rate based on the determined count of unit tests, the aggregate pass rate indicating whether the model produces candidates that correspond to the first quality notation;
   determining whether the first likelihood being greater than the second likelihood based on the aggregate pass rate; and
   based on a determination that the first likelihood is greater than the second likelihood, determining whether the model passed one unit test in the evaluation dataset, wherein the first quality notation is associated with a higher quality candidate and the second quality notation is associated with a lower quality candidate.

19. The processor-readable non-transitory storage medium of claim 18, wherein generating the unit tests comprises:
- determining via a generating model, a likelihood of generating a plurality of candidates including the first candidate and the second candidate in response to the input context;
- receiving the first quality notation associated with the first candidate;
- receiving the second quality notation associated with the second candidate;
- determining whether the first candidate and the second candidate provide a near negative distinction, the near negative distinction indicating a difference in quality of output of the generating model in response to the input context; and
- generating a unit text that associates the input context with the first candidate having the first quality notation and the second candidate having the second quality notation, such that the first candidate and the second candidate provide a near-negative distinction to evaluate the model.

20. The processor-readable non-transitory storage medium of claim 18, wherein the first quality notation is associated with a no error categorization and the second quality notation is associated with at least one of a disfluent, an off-target and a wrong context error categorization.

* * * * *